United States Patent [19]

Kawakami et al.

[11] Patent Number: 4,689,662
[45] Date of Patent: Aug. 25, 1987

[54] METHOD OF RECORDING AND REPRODUCING LINE SEQUENTIAL COLOR VIDEO SIGNAL

[75] Inventors: Chikuni Kawakami; Ikuhisa Sekizawa, both of Kanagawa, Japan

[73] Assignee: Fuji Photo Film Co., Ltd., Kanagawa, Japan

[21] Appl. No.: 735,852

[22] Filed: May 20, 1985

[30] Foreign Application Priority Data

May 22, 1984 [JP] Japan ................................ 59-101833

[51] Int. Cl.⁴ .............................................. H04N 5/91
[52] U.S. Cl. .................................................... 358/14
[58] Field of Search ...................... 358/14, 11, 12, 310, 358/315, 316

[56] References Cited

U.S. PATENT DOCUMENTS 4,574,301  3/1986  Sachs ..................................... 358/14

Primary Examiner—Michael A. Masinick
Attorney, Agent, or Firm—Abelman, Frayne, Rezac & Schwab

[57] ABSTRACT

A method of recording and reproducing a line sequential color video signal comprising the steps of converting the reproduced two separate line sequential color difference signals into simultaneous color difference signals, subjecting two separate carriers to balanced modulation by said simultaneous color difference signals to provide simultaneous carrier color difference signals, mixing the simultaneous carrier color difference signals delayed by one horizontal scanning period with those not delayed, and combining the resultant signals with a luminance signal delayed by one horizontal scanning period during recording or reproduction of the video signal.

4 Claims, 7 Drawing Figures

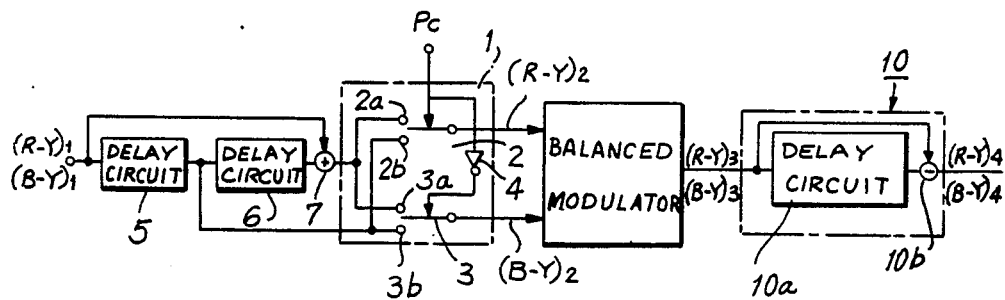

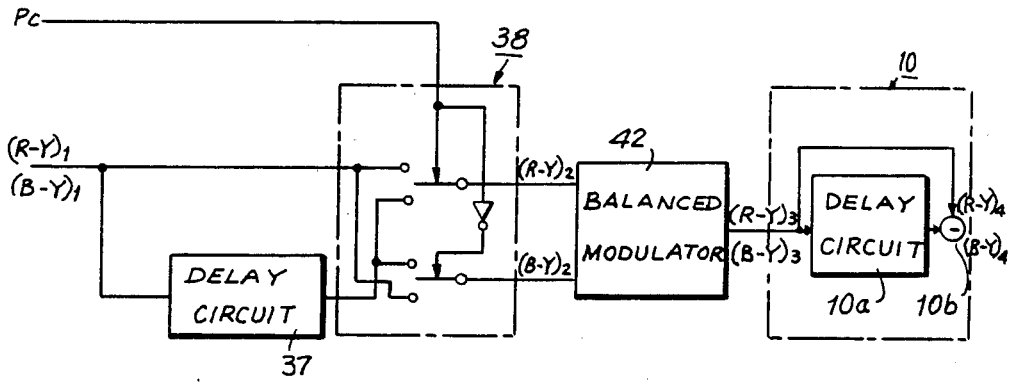

FIG. 5

METHOD OF RECORDING AND REPRODUCING LINE SEQUENTIAL COLOR VIDEO SIGNAL

BACKGROUND OF THE INVENTION

This invention relates to a method of recording and reproducing a line sequential color video signal, and more particularly to the elimination of color errors in a reproducing system.

In countries including France, a line sequential television system called the SECAM system is a standard television system. Two color difference signals R-Y and B-Y are alternately switched over to be selected at a time interval of one horizontal scanning period (abbreviated here in after as a period of 1H) and are used for frequency modulation of a subcarrier, and a luminance signal is superposed on the frequency-modulated color difference signals to constitute a carrier color video signal. In a reproducing system reproducing the carrier color video signal, the color difference signal delayed by the period of 1H and the color difference signal not subjected to the delay are derived in parallel relation, so that the color difference signals R-Y and B-Y dropped out at the time interval of the period of 1H at the time of recording are complemented by the color difference signals R-Y and B-Y demodulated in the preceding horizontal scanning periods to obtain the two independent and continuous color difference signals R-Y and B-Y. For this purpose, the reproducing system includes a switch for alternately deriving the color difference signal delayed by the period of 1H and the color difference signal not subjected to the delay. Deriving the two kinds of color difference signals in parallel relation as described above is called the simultaneous, and the switch provided for that purpose is called a simultaneous switch.

FIGS. 1(a) to 1(e) illustrate conceptionally the structure of various color difference signals appearing in a system resorting to the line sequential method. In FIGS. 1(a) to 1(e), suffixes attached 1, 2, 3, 4, --- to the symbol Y indicate the numbers of the horizontal scanning lines to which specific color difference signals R-Y and B-Y belong, and each block corresponds to the period of 1H. Color difference signals R-Y and B-Y shown in FIGS. 1(a) and 1(b) respectively are alternately selected by a line sequential switch at the time interval of the period of 1H to provide line sequential color difference signals (R-Y)1 and (B-Y)1 shown in FIG. 1(c). In this case, the line sequential color difference signals (R-Y)1 and (B-Y)1 include the color difference signals R-Y and B-Y belonging to the odd-numbered and even-numbered periods of 1H respectively as shown. In the reproducing, system, such line sequential color difference signals (R-Y)1 and (B-Y)1 are delayed and not delayed by the period of 1H, and the delayed signals and the thru signals are applied to the simultaneous switch to provide two kinds of simultaneous color difference signals (R-Y)2 and (B-Y)2 as shown in FIG. 1(d) and 1(e) respectively.

It will be apparent from reference to FIGS. 1(d) and 1(e) that, according to the line sequential method, the line sequential color difference signal (R-Y)1 delayed by the period of 1H provides the signal belonging to the even-numbered 1H period of the simultaneous color difference signal (R-Y)2. And the line sequential color difference signal (B-Y)1, delayed by the period of 1H provides the signal belonging to the odd-numbered 1H period of the simultaneous color difference signal (B-Y)2. And color problem does not arise when there is a correlation between the color difference signal R-Y belonging to a certain period of 1H and the color difference signal B-Y belonging to the next adjacent period of 1H. However, when there is a great variation between the color difference signal R-Y belonging to a certain period of 1H and the color difference signal B-Y belonging to the next adjacent period of 1H, a color deviating greatly from the original color will be reproduced. Suppose, for example, that there is a great variation between the color difference signals R-Y3 and B-Y3 belonging to the 3rd period of 1H and the color difference signals R-Y4 and B-Y4 belonging to the 4th period of 1H. Since, in such a case, the color difference signals R-Y3 and B-Y4 in the respective simultaneous color difference signals (R-Y4)2 and (B-Y4)2 are those corresponding to the 4th period of 1H, reproduction of the color difference signal R-Y3 will give rise to a color error.

FIG. 2 is a block diagram showing the structure of a prior art reproducing system which is designed to reduce the color error described above. Referring to FIG. 2, a simultaneous switch 1 includes a first switch 2 generating the simultaneous color difference signal (R-Y)2 and a second switch 3 generating the simultaneous color difference signal (B-Y)2. The first switch 2 has contacts 2a and 2b, and the second switch 3 has contacts 3a and 3b. A control Pulse signal Pc is applied directly to the first switch 2 and through an inverter 4 to the second switch 3 for changing over the switches 2 and 3 at a time interval of the period of 1H, so that the switch contacts 2a, 3b and the switch contacts 2b, 3a can be simultaneously selected respectively. The line sequential color difference signals (R-Y)1 and (B-Y)1 delayed by the period of 2H by two 1H delay circuits 5 and 6 are applied to a mixer 7 together with the line sequential color difference signals (R-Y)1 and (B-Y)1 not subjected to the delay. The color difference signals (R-Y)1 and (B-Y)1 applied to the mixer 7 are mixed together, and the resultant signal is divided by the factor of 2 in the mixer 7 to appear as a color difference output signal (thru)+(2HDL)/2 which is applied to the switch contacts 2a and 3a. On the other hand, the line sequential color difference signals (R-Y)1 and (B-Y)1 delayed by the period of 1H by the 1H delay circuit 5 are applied to the switch contacts 2b and 3b.

FIGS. 3(a) to 3(d) illustrate conceptionally the structure of the simultaneous color difference signals (R-Y)2 and (B-Y)2 produced in the reproducing system shown in FIG. 2 and illustrate also the relation between these signals and the color difference signals R-Y and B-Y shown in FIG. 1 on the same time base.

It will be apparent from reference to FIG. 3(a) to 3(d) that the simultaneous color difference signal (R-Y)2 is such that the color difference signal (R-Yn)+(R-Yn-2)/2, which is provided by dividing, by the factor of 2, the sum of the color difference signal (R-Yn-2) applied at the time preceding the present time by the period of 2H and the color difference signal (R-Yn) applied at the present time, is followed by the color difference signal (R-Yn), replacing the color difference signal (R-Yn+1) applied at the time preceding the present time by the period of 1H, and such a relation is sequentially repeated. Also, the simultaneous color difference signal (B-Y)2 is such that the color difference signal (B-Yn-1) applied at the time preceding the present time by the period of 1H is followed by the color difference signal (B-Yn+1)+(B-Yn-1)/2 provided by dividing, by the factor of 2, the sum of the color difference signal (B-Yn-1) applied at the time preceding the present time by the period of 2H and the color difference signal (B-Yn+1) applied at the present time, and such a relation is sequentially repeated.

Therefore, the adverse effect attributable to the variation of the color difference signals R-Y and B-Y can be reduced to the half, but the adverse effect appears still over the period of 2H.

When the circuit shown in FIG. 2 is employed, the luminance signal Y is also delayed by the period of 1H although not illustrated.

The simultaneous color difference signals obtained by the methods shown in FIGS. 1 and 3 were directly converted into NTSC standard video signals through an encoder, and these video signals were actually reproduced on a screen of a television receiver for the purpose of comparison. As a result, it has been found that although the absolute value of the color error is large in the case of the method shown in FIG. 1, the color error is not so marked when compared with that observed in the case of the method shown in FIG. 3 in which the color error appears over the period of 2H.

A common practice for converting the simultaneous color difference signals (R-Y)2 and (B-Y)2 into an NTSC standard video signal includes subjecting two kinds of carriers to balanced modulation by the simultaneous color difference signals (R-Y)2 and (B-Y)2 respectively, mixing the thus obtained, simultaneous carrier color difference signals (R-Y)3 and (B-Y)3, and then mixing the resultant signal mixture with the luminance signal Y. In this connection, in an attempt to improve the S/N ratio of the simultaneous carrier color difference signals (R-Y)3 and (B-Y)3, the inventor of the present invention has thought of applying the simultaneous carrier color difference signals (R-Y)3 and (B-Y)3 to a comb filter.

Describing in more detail, this comb filter 10 is composed of a 1H delay circuit 10a and a mixer as 10b, as shown in FIGS. 2 and 4. The thru simultaneous carrier color difference signals (R-Y)3 and (B-Y)3 are applied, together with the delayed simultaneous carrier color difference signals (R-Y)3 and (B-Y)3 delayed by the period of 1H by the 1H delay circuit 10a, to the mixer 10b which generates output signals (R-Y)4 and (B-Y)4 divided by the factor of 2. Such an arrangement is advantageous in that, while the carrier color difference signals (R-Y)3 and (B-Y)3 are added together, the level of noise occurring at random does not become as high as that of the carrier color difference signals (R-Y)3 and (B-Y)3, so that the S/N ratio can be improved correspondingly. In FIG. 4 reference numerals 37, 38 and 42 designate a 1H delay circuit, a simultaneous, switch and a balanced modulator, respectively.

FIG. 3(e) and 3(f) illustrate conceptionally the structure of the simultaneous carrier color difference signals (R-Y)4 and (B-Y)4 provided when the simultaneous carrier color difference signals (R-Y)3 and (B-Y)3, obtained by the prior art circuit shown in FIG. 2, are passed through the comb filter 10 so as to improve the S/N ratio. It will be apparent from FIG. 3(e) that, in the simultaneous carrier color difference signal (R-Y)4 generated from the comb filter 10, one of the color difference signals, for example, the color difference signal (R-Y1) appears over the consecutive period of 4H, and the succeeding color difference signal (R-Y2) appears later by the period of 2H than the color difference signal (R-Y)1 and lasts over the period of 4H, due to the provision of the 1H delay circuits 5, 6 and 10b. It will be similarly apparent from FIG. 3(f) that, in the other simultaneous carrier color difference signal (B-Y)4 generated from the comb filter 10, one of the color difference signals, for example, the color difference signal (B-Y1) appears over the period of 4H, and the succeeding color difference signal (B-Y2) appears later by the period of 2H than the color difference signal (B-Y1) and lasts over the period of 4H. The signals (R-Y)4 and (B-Y)4 described above are periodically generated with a delay time of 1H relative to each other. Therefore, when the prior art circuit having the structure shown in FIG. 2 is used, the adverse effect attributable to variations of the signals R-Y and B-Y lasts over the period of 4H.

FIGS. 5(a) to 5(e) illustrate conceptionally the structure of the color difference signals appearing from the various parts of the circuit shown in FIG. 4 and are similar to FIGS. 1(a) to 1(e) respectively. It will be seen in FIGS. 5(a) to 5(c) that the line sequential color difference signals (R-Y)1, (B-Y)1, the simultaneous color difference signals (R-Y)2, (B-Y)2 and the simultaneous carrier color difference signals (R-Y)3, (B-Y)3 have structures similar to those shown in FIGS. 1(a) to 1(e).

On the other hand, the simultaneous carrier color difference signal (R-Y)4 generated from the comb filter 10 has a structure as shown in FIG. 5(d). It will be seen in FIG. 5(d) that, in the case of an odd-numbered or (2n+1)th horizontal scanning line, the output of the comb filter 10 is the signal generally expressed as (R-Y2n-1)+(R-Y2n+1)/2, that is, the signal provided by dividing, by the factor of 2, the sum of the color difference signal (R-Y2n+1) belonging to the (2n+1)th horizontal scanning line and the color difference signal (R-Y2n-1) belonging to the horizontal scanning line preceding the (2n+1)th horizontal scanning line by the period of 2H. On the other hand, in the case of an even-numbered or 2(n+1)th horizontal scanning line, the output of the comb filter 10 is the signal generally expressed as (R-Y2n-1), that is, the signal provided by dividing, by the factor of 2, the sum of the color difference signals (R-Y2n-1) belonging to the horizontal scanning line preceding the 2(n+1)th horizontal scanning line by the period of 1H. Similarly, the simultaneous carrier color difference signal (B-Y)4 generated from the comb filter 10 has a structure as shown in FIG. 5(e). It will be seen in FIG. 5(e) that, in the case of an odd-numbered or (2n+1)th horizontal scanning line, the output of the comb filter 10 is the signal generally expressed as (B-Y2n), that is, the signal provided by dividing, by the factor of 2, the sum of the color difference signals (B-Y2n) belonging to the horizontal scanning line preceding the (2n+1)th horizontal scanning line by the period of 1H. On the other hand, in the case of an even-numbered or 2(n+1)th horizontal scanning line, the output of the comb filter 10 is generally expressed as (B-Y2n)+(B-Y2(n+1)/2, that is, the signal provided by dividing, by the factor of 2, the sum of the color difference signal (B-Y2(n+1) belonging to the 2(n+1)th horizontal scanning line and the color difference signal (B-Y2n) belonging to the horizontal scanning line preceding the 2(n+1)th horizontal scanning line by the period of 2H.

Direct mixing of the luminance signal Y as shown in FIG. 5(f) with those carrier color difference signals (R-Y)4 and (B-Y)4 may give rise to a large color error resulting in a degraded quality of the reproduced picture, when great variations occur in the color difference signals R-Y and B-Y between a certain horizontal scanning line and the next adjacent horizontal scanning line.

SUMMARY OF THE INVENTION

With a view to obviate prior art defects as pointed out above, it is a primary object of the present invention to minimize a color error encountered hitherto by providing a method of recording and reproducing a line sequential color video signal in which, for the purpose of converting the line sequential color video signal into an NTSC standard color video signal, two separate carriers are subjected to balanced modulation by two separate simultaneous color difference signals respectively to obtain two separate simultaneous carrier color difference signals, and, after mixing these simultaneous carrier color difference signals, the mixed simultaneous carrier color difference signals are passed through a comb filter.

In accordance with the present invention which attains the above object, there is provided a method of recording and reproducing a line sequential color video signal including alternately selecting two kinds of color difference signals at a time interval of one horizontal scanning period to arrange the color difference signals in a line sequential fashion in a recording system and converting the two kinds of color difference signals recorded in the line sequential fashion into simultaneous color difference signals in a reproducing system, the method comprising the steps of converting the reproduced two kinds of line sequential color difference signals into simultaneous color difference signals, subjecting two kinds of carriers to balanced modulation by the simultaneous color difference signals to provide simultaneous carrier color difference signals, mixing the simultaneous carrier color difference signals delayed by one horizontal scanning period with those not delayed, and combining the resultant signals with a luminance signal delayed by one horizontal scanning period during recording or reproduction of the video signal.

According to the method of the present invention described above, although the combination of the two kinds of color difference signals is merely displaced downward by the period of 1H on a television screen in the reproducing system, the combination of one of the color difference signals and the luminance signal in a certain period of 1H is normal. Therefore, even when a great color variation occurs between the color difference signals appearing in a certain period of 1H and the next period of 1H, the adverse effect attributable to color errors can be limited to a minimum, since one of the other color difference signals appearing in one of the periods of 1H belonging to the period of 2H in which the two separate the color difference signals appear, has the correlation with the normal color difference signal, as described in detail later.

BRIEF DESCRIPTION OF THE DRAWINGS

FIGS. 1(a) to 1(e) illustrate conceptionally the structure of various color difference signals arranged in a line sequential fashion.

FIG. 2 is a block diagram showing the structure of a prior art reproducing system proposed for reproducing the line sequential color difference signals shown in FIG. 1.

FIG. 3(a) to 3(f) illustrate conceptionally the structure of the simultaneous color difference signals produced in the reproducing system shown in FIG. 2 and illustrate also the relation between these signals and the color difference signals shown in FIG. 1 on the same time base.

FIG. 4 is a block diagram showing the structure of another reproducing system proposed for improving the S/N ratio of the line sequential color difference signals shown in FIG. 1.

FIGS. 5(a) to 5(f) illustrate conceptionally the structure of the color difference signals and luminance signal when the reproducing system shown in FIG. 4 is employed.

FIG. 5(g) illustrate conceptionally the structure of the luminance signal employed in an embodiment of the method according to the present invention.

DESCRIPTION OF THE PREFERRED EMBODIMENT

A preferred embodiment of the method according to the present invention will now be described in detail with reference to the drawings.

Figure 6A:
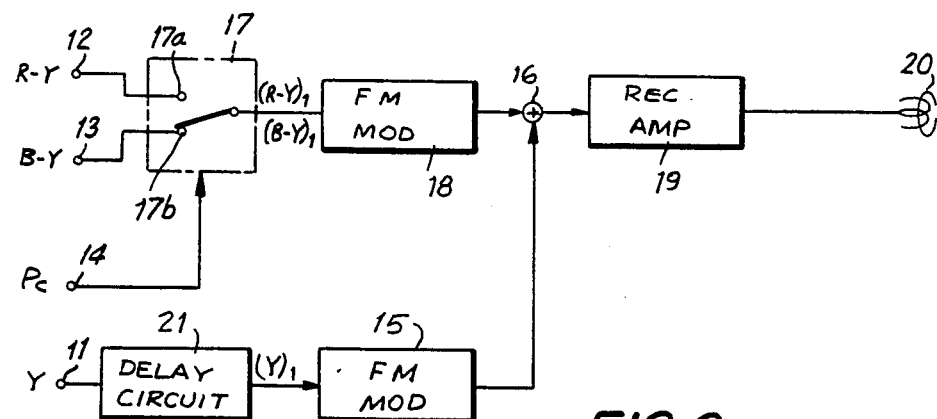
FIG. 6(a) is a block diagram showing the structure of a recording system employed to put into practice an embodiment of the method according to the present invention.

FIG. 6(a) is a block diagram showing the structure of a recording system preferably employed to put into practice an embodiment of the method according to the present invention. Referring to FIG. 6(a), a luminance signal Y in a color video signal is applied to an input terminal 11, and color difference signals R-Y and B-Y in the color video signal are applied to input terminals 12 and 13 respectively. A control pulse signal Pc whose state changes at a time interval of one horizontal scanning period (1H) is applied to another input terminal 14. The luminance signal Y is passed through a 1H delay circuit 21 to be delayed by the period of 1H, and the delayed luminance signal (Y)1 is applied to an FM modulator 15 to be turned into a carrier luminance signal which is applied to a mixer 16. The color difference signals R-Y and B-Y are arranged in a line sequential fashion by a line sequential switch 17. That is, in response to the application of the control pulse signal Pc, contacts 17a and 17b of the line sequential switch 17 are alternately selected at a time interval of 1H for alternately selecting the color difference signals R-Y and B-Y. The line sequential color difference signals (R-Y)1 and (B-Y)1 thus obtained are applied to another FM modulator 18 to be turned into carrier color difference signals which are applied to the mixer 16. In the mixer 16, the carrier luminance signal is superposed on the carrier color difference signals to provide a carrier color video signal which is applied through a recording amplifier 19 to a recording head 20 to be recorded on a magnetic recording medium (not shown).

Figure 6B:
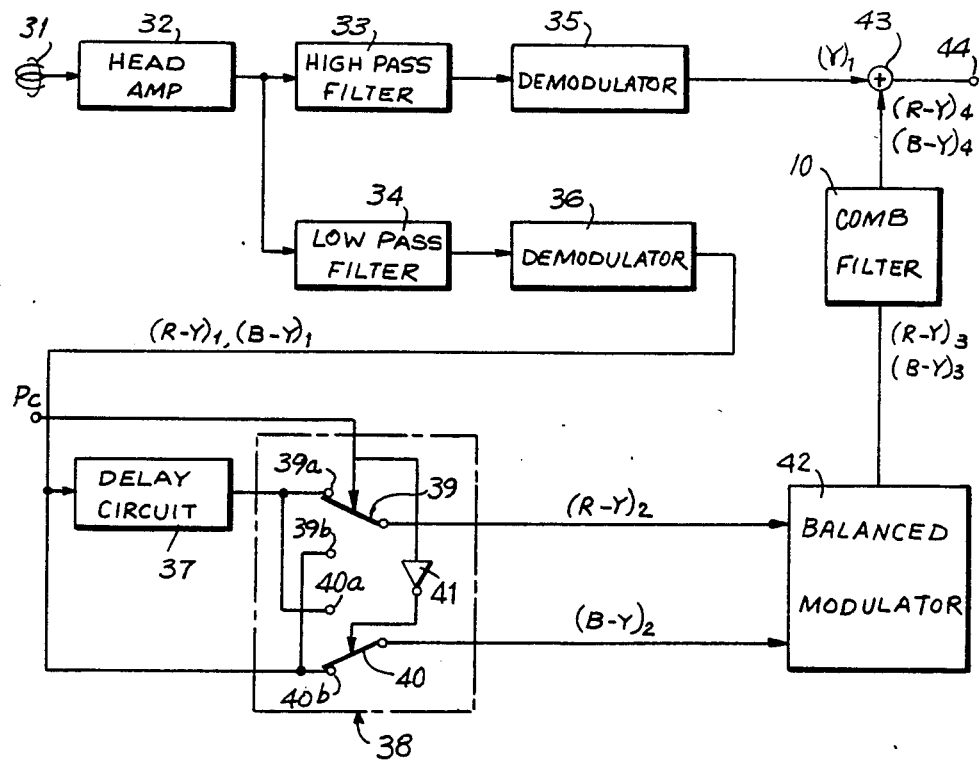
FIG. 6(b) is a block diagram showing the structure of a reproducing system associated with the recording system shown in FIG. 6(a).

FIG. 6(b) is a block diagram showing the structure of a reproducing system preferably employed to put into practice the embodiment of the method according to the present invention. Referring to FIG. 6(b), a reproducing head 31 reproduces the carrier color video signal recorded on the magnetic recording medium (not shown) by the recording head 20 in the recording system shown in FIG. 6(a). The carrier color video signal reproduced by the reproducing head 31 is applied through a head amplifier 32 to a high-pass filter 33 and a low-pass filter 34. In the high-pass filter 33, the carrier luminance signal is extracted from the carrier color video signal to be applied to an FM demodulator 35. As a result, the luminance signal (Y)1 appears at the output of the FM demodulator 35. On the other hand, the carrier color difference signals extracted from the carrier color video signal in the low-pass filter 34 are applied to another FM demodulator 36. As a result, the line sequential color difference signals (R-Y)1 and (B-Y)1 appear at the output of the FM demodulator 36. One of the line sequential color difference signals (R-Y)1 and (B-Y)1 is applied to a simultaneous switch 38 together with the other line sequential color difference signal which has been demodulated in the preceding period of 1H delayed by the period of 1H by a 1H delay circuit 37. The structure of the simultaneous switch 38 is similar to that of the simultaneous switch 1 shown in FIG. 2. Thus, the simultaneous switch 38 includes a first switch 39 for generating the simultaneous color difference signal (R-Y)2 and a second switch 40 for generating the simultaneous color difference signal (B-Y)2. The first switch 39 has contacts 39a and 39b, and the second switch 40 has contacts 40a and 40b. The control pulse signal Pc is applied directly to the first switch 39 and through an inverter 41 to the second switch 40 for changing over the switches 39 and 40 at a time interval of 1H, so that the switch contacts 39a, 40b and the switch contacts 39b, 40a can be simultaneously selected respectively. The line sequential color difference signals (R-Y)1 and (B-Y)1 delayed by the period of 1H are applied to the switch contacts 39a and 40a respectively, while the line sequential color difference signals (R-Y)1 and (B-Y)1 demodulated at the present time are applied to the switch contacts 39b and 40b respectively. The simultaneous color difference signals (R-Y)2 and (B-Y)2 appearing from the simultaneous switch 38 are applied to a balanced modulator 42. In the balanced modulator 42, two kinds of carriers are subjected to balanced modulation by the simultaneous color difference signals (R-Y)2 and (B-Y)2 respectively, and the resultant two kinds of simultaneous carrier color difference signals (R-Y)3 and (B-Y)3 are mixed together. A comb filter 10 is similar to that shown in FIG. 4. The comb filter 10 includes a 1H delay circuit 10a for delaying the mixed simultaneous carrier color difference signals (R-Y)3 and (B-Y)3 by the period of 1H, and a mixer 10b for mixing the delayed signals with the thru signals not delayed. The resultant output signals of the comb filter 10, that is, the simultaneous carrier color difference signals (R-Y)4 and (B-Y)4 are applied to a mixer 43. In the mixer 43, the signals (R-Y)4 and (B-Y)4 are combined with the luminance signal (Y)1 to provide the original color video signal which is generated from an output terminal 44.

Figure 5:
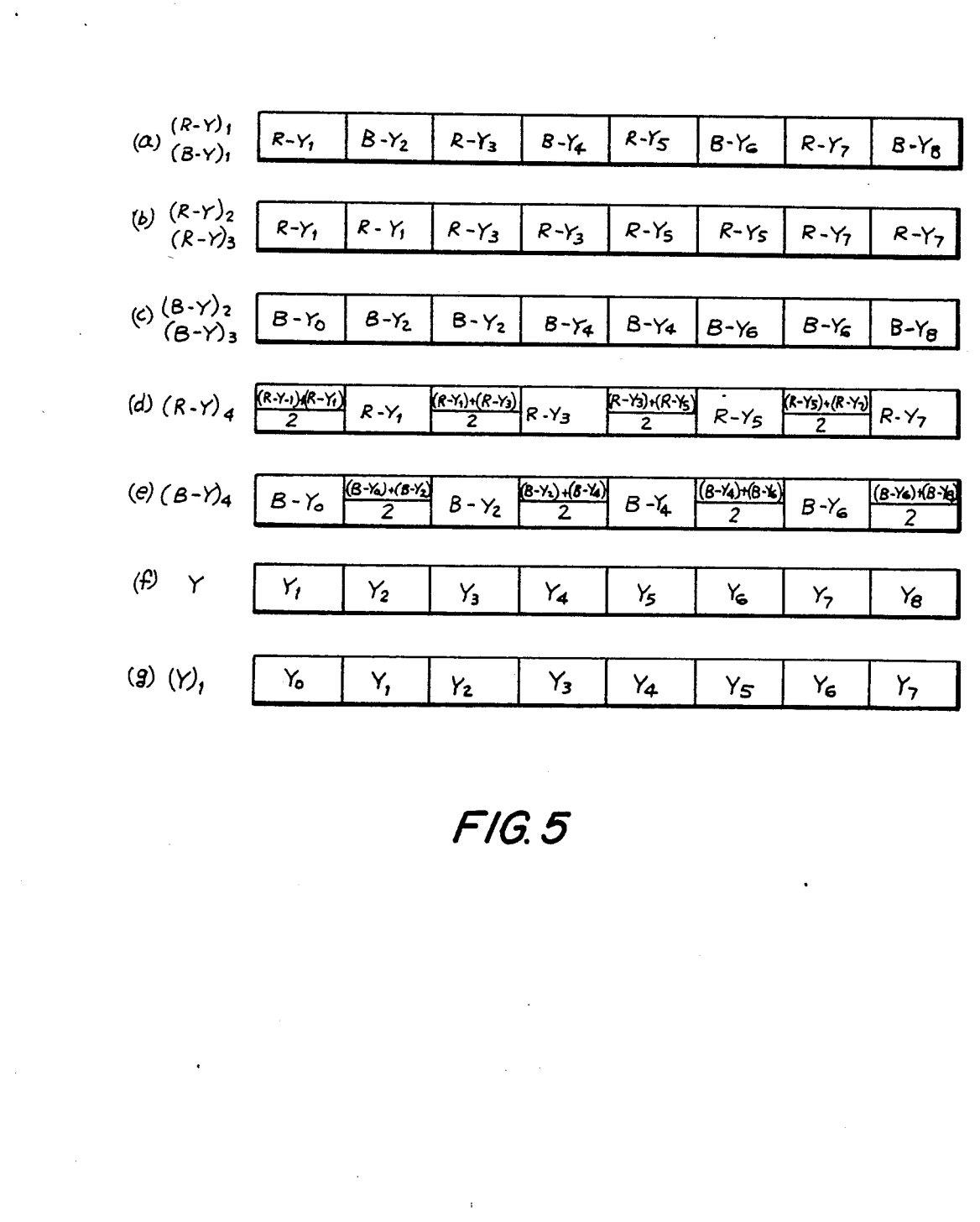

The color difference signals R-Y, B-Y and the luminance signal Y appearing in the recording system and reproducing system show in FIG. 6(a) and 6(b) have structure as shown in FIGS. 5(a) to 5(e) and FIG. 5(g). It will be seen that the luminance signal (Y)1 differs from that shown in FIG. 5(f). As seen in FIG. 5(g), the luminance signal (Y)1 is delayed by the period of 1H from that shown in FIG. 5(f) according to the embodiment of the present invention. Therefore, the adverse effect attributable to color errors is reduced although the combination of the color difference signals R-Y and B-Y is displaced downward by the period of 1H on the television screen. The effect of color error reproduction will be described in more detail. Suppose, for example, that a great color variation occurs between the 3rd period of 1H and the 4th period of 1H in FIGS. 5(d) and 5(e). Even in such a case, the luminance signal (Y)1 in the 4th period of 1H is Y3 as seen in FIG. 5(g), and the simultaneous carrier color difference signal (R-Y)4 in that period is R-Y3 as seen in FIG. 5(d). Thus, the combination of these signals is normal. Further, although the simultaneous carrier color difference signal (B-Y)4 in that period is (B-Y2)+(B-Y4)/2 which differs greatly from B-Y4 as seen in FIG. 5(e), the correlation between B-Y2 and B-Y3 reduces the color error correspondingly. Incidentally, when the luminance signal Y is reproduced intact as shown in FIG. 5(f), the combination of Y4 in the luminance signal Y and B-Y4 in the simultaneous carrier color difference signal (B-Y)4 in the specific period described above is normal only, and the other combination will deviate from the normal one.

In the systems shown in FIGS. 6(a) and 6(b), the luminance signal Y is delayed by the period of 1H in the recording system. However, it is apparent that the same effect is exhibited even when the luminance signal Y is so delayed in the reproducing system. Further, the present invention is also applicable to a method of recording and reproducing a line sequential color video signal, in which line sequential color difference signals themselves are applied to a balanced modulator for balanced modulation of carriers, and the resultant signals are applied to a simultaneous switch.

We claim:

1. A method of recording and reproducing a line sequential color video signal of the type in which two different color difference signals are alternately selected at a time interval of one horizontal scanning period, arranged in a line sequential fashion in a recording system and converted into simultaneous color difference signals in a reproducing system, comprising the following steps:

converting said two different color difference signals into simultaneous color difference signals;

subjecting two different carriers to balanced modulation by said simultaneous color difference signals to provide simultaneous carrier color difference signals;

delaying said simultaneous carrier color difference signals by one horizontal scanning period;

mixing said delayed simultaneous carrier color difference signals with undelayed simultaneous carrier color difference signals;

delaying a luminance signal by a time interval of one horizontal scanning period during recordation of the video signal; and combining said mixed signals with said delayed luminance signal.

2. A method of recording and reproducing a line sequential color video signal of the type in which two different color difference signals are alternately selected at a time interval of one horizontal scanning period, arranged in a line sequential fashion in a recording system and converted into simultaneous color difference signals in a reproducing system, comprising the following steps;

converting said two different color difference signals into simultaneous color difference signals;

subjecting two different carriers to balanced modulation by said simultaneous color difference signals to provide simultaneous carrier color difference signals;

delaying said simultaneous carrier color difference signals by one horizontal scanning period;

mixing said delayed simultaneous carrier color difference signals with undelayed simultaneous carrier color difference signals;

delaying a luminance signal by a time interval of one horizontal scanning period during reproduction of the video signal; and combining said mixed signals with said delayed luminance signal.

3. Apparatus for recording a line sequential color video signal from two different color difference signals, a control pulse signal which changes state at a time interval of one horizontal scanning period and a luminance signal, comprising:

line sequential switch means for generating a line sequential signal from said two different color difference signals in accordance with said control pulse signal;

modulator means for modulating a carrier with said line sequential signal and thereby producing a carrier color difference signal;

means for delaying said luminance signal by a time interval of one horizontal scanning period;

modulator means for modulating a carrier with said delayed luminance signal and thereby producing a carrier luminance signal; and mixer means for superposing said carrier color difference signal and said carrier luminance signal.

4. Apparatus for reproducing a line sequential color video signal from line sequential video signal derived superposed carrier color difference signals and carrier luminance signals, comprising:

means for producing a control pulse signal which changes state at a time interval of one horizontal scanning period;

means for extracting said carrier color difference signals from said carrier luminance signals;

means for delaying said carrier color difference signals by a time interval of one horizontal scanning period;

simultaneous switch means for producing, from said control pulse signal, said delayed carrier color difference signals and said undelayed carrier color difference signals, two different simultaneous color difference signals;

balanced modulator means for modulating two different carriers with said two different simultaneous color difference signals and mixing them together;

comb filter means for delaying said mixed signals by a time interval of one horizontal scanning period, superposing said delayed mixed signals with said undelayed mixed signals and halving the resultant superposed sum; and mixer means for superposing signals produced by said comb filter means with said carrier luminance signals.

* * * * *